(No Model.)
W. J. MORAN.
SHACKLE FOR VEHICLE SPRINGS.
No. 281,547. Patented July 17, 1883.
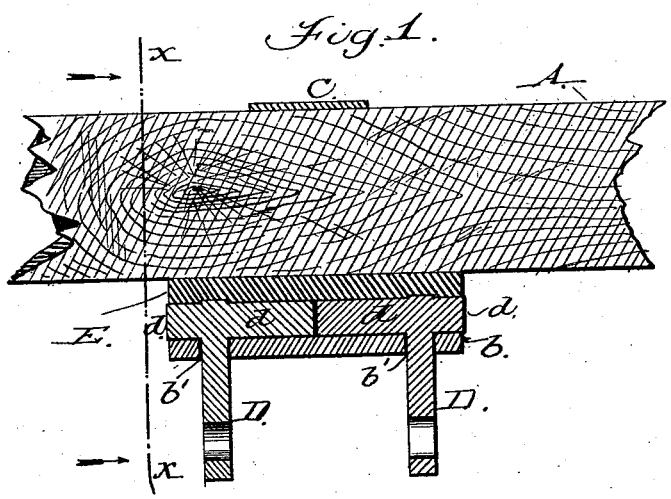
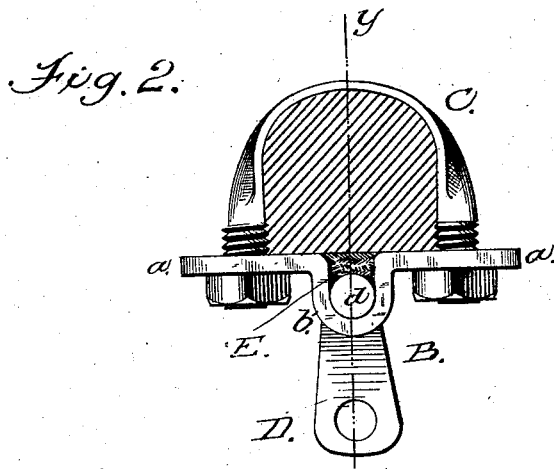
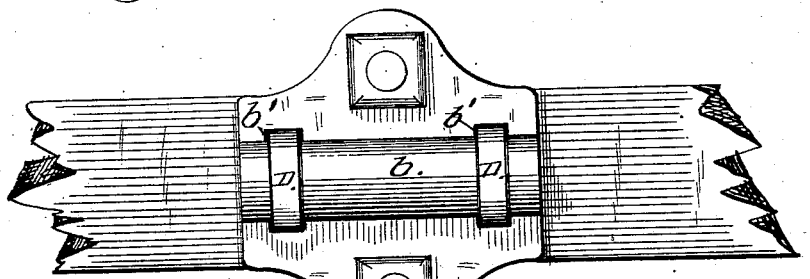
Witnesses;
Walter Fowler
H. B. Applewhaite
Inventor;
W. J. Moran
per atty
A. H. Evans

UNITED STATES PATENT OFFICE.

WILLIAM J. MORAN, OF FREEPORT, ILLINOIS.

SHACKLE FOR VEHICLE-SPRINGS.

SPECIFICATION forming part of Letters Patent No. 281,547, dated July 17, 1883.

Application filed June 1, 1883. (No model.)

To all whom it may concern:

Be it known that I, WILLIAM J. MORAN, of Freeport, in the county of Stephenson and State of Illinois, have invented a new and useful Improvement in Shackles, of which the following is a full, clear, and exact description, reference being had to the accompanying drawings, making a part of this specification, in which—
Figure 1 is a section through $y y$ of Fig. 2. Fig. 2 is an end elevation. Fig. 3 is a plan view.

My invention relates more particularly to that class of shackles designed for holding the ends of vehicle-springs; and it consists in certain combinations of devices hereinafter explained and claimed.

To enable others skilled in the art to make and use my invention, I will proceed to describe the exact manner in which I have carried it out.

In the drawings, A represents a section of the side bar of a vehicle, to which is secured the shackle B by means of the clip C. The shackle B is composed of the plate $a$, bent longitudinally at its center, so as to form the curve $b$, as shown in Fig. 2. This curved portion of the plate is slotted at $b' b'$, to receive the independent swinging arms D D, provided with the trunnions $d d$, having their bearings in the curve $b$ of the plate $a$, as shown in Figs. 1 and 2. Between the trunnions $d d$ and the under surface of the side bar, A, I introduce a rubber or other elastic packing, E, to steady the operation of the shackle and avoid all rattling and noise. Through the lower portion of each of the swinging arms D is a hole or perforation for the reception of a bolt to which is to be attached the end of the vehicle-spring when in use.

Having thus described my invention, what I claim as new, and desire to secure by Letters Patent, is—

The plate $a$, provided with the longitudinal curve $b$, slotted at $b' b'$, in combination with the swinging arms D D, provided with the trunnions $d d$, and the packing E, all constructed to operate substantially as and for the purpose herein set forth.

WILLIAM J. MORAN.

Witnesses:
   A. F. GREEN,
   CHARLES T. GREEN.